(12) United States Patent
Bauer

(10) Patent No.: US 8,820,561 B2
(45) Date of Patent: Sep. 2, 2014

(54) CLOSURE

(75) Inventor: Angelika Barbara Maria Bauer, Raubling (DE)

(73) Assignee: Temtec Fahrzeugtechnik Entwicklungsgesellschaft mbH, Raubling (DE)

( * ) Notice: Subject to any disclaimer, the term of this patent is extended or adjusted under 35 U.S.C. 154(b) by 975 days.

(21) Appl. No.: 12/839,004

(22) Filed: Jul. 19, 2010

(65) Prior Publication Data

US 2011/0174816 A1    Jul. 21, 2011

(30) Foreign Application Priority Data

Jul. 23, 2009   (DE) .................. 10 2009 034 428

(51) Int. Cl.
*B60K 15/04*    (2006.01)
*B60K 15/05*    (2006.01)

(52) U.S. Cl.
CPC ...................................... *B60K 15/05* (2013.01)
USPC ........... 220/86.2; 220/264; 220/830; 141/350

(58) Field of Classification Search
USPC ............. 141/350, 311 R, 368; 220/86.2, 200, 220/211, 252, 260, 262–264, 280, 282, 283, 220/315, 810, 823, 827, 829, 830; 16/277, 16/278, 281, 293, 295, 308
See application file for complete search history.

(56) References Cited

U.S. PATENT DOCUMENTS

| | | | | |
|---|---|---|---|---|
| 5,465,861 A * | 11/1995 | Kunz et al. | ..................... | 220/260 |
| 5,620,122 A * | 4/1997 | Tanaka | ..................... | 224/275 |
| 5,950,368 A * | 9/1999 | Bradford | ..................... | 52/20 |
| 6,009,920 A * | 1/2000 | Palvoelgyi et al. | ........... | 141/348 |
| 6,234,555 B1 * | 5/2001 | Emmerich et al. | ......... | 296/97.22 |
| 6,609,631 B2 * | 8/2003 | Asami | ..................... | 220/817 |
| 6,715,813 B2 * | 4/2004 | Thompson et al. | ........... | 296/1.02 |
| 7,025,225 B2 * | 4/2006 | Inari | ..................... | 220/830 |
| 7,163,037 B2 * | 1/2007 | Walkowski | ..................... | 141/350 |
| 7,231,692 B2 * | 6/2007 | Harada | ..................... | 16/345 |
| 7,258,245 B2 * | 8/2007 | Bauer | ..................... | 220/211 |
| 8,151,837 B2 * | 4/2012 | Beier et al. | ..................... | 141/350 |
| 8,439,421 B2 * | 5/2013 | Mihai | ..................... | 296/97.22 |
| 2007/0107800 A1 * | 5/2007 | Baudoux et al. | ............... | 141/98 |
| 2009/0195009 A1 * | 8/2009 | Kikuchi | ..................... | 296/37.9 |
| 2011/0306223 A1 * | 12/2011 | Bauer | ..................... | 439/136 |

FOREIGN PATENT DOCUMENTS

| | | |
|---|---|---|
| DE | 42 42 598 | 6/1994 |
| DE | 195 35 335 | 3/1997 |
| DE | 103 15 513 | 10/2004 |

\* cited by examiner

*Primary Examiner* — Timothy L Maust
*Assistant Examiner* — Robert Bell, III
(74) *Attorney, Agent, or Firm* — Nixon & Vanderhye P.C.

(57) ABSTRACT

In a closure for closing the orifice (13) of a neck (12), in particular the orifice of a fuel filler neck for automotive vehicles, a spring mechanism is provided which takes the form of a tightening device for drawing the closure part (14) automatically into its final closed position. The movement of the closure part (14) is controlled by a first guide slot (19). The operating lever (35), by means of which the closure part is moved, is furthermore hinged to the closure part (14) by means of a second guide slot (39), which, when an opening force is introduced via the closure part (14), blocks the movement of the closure part (14) from its closed position in the opening direction so that the closure part (14) cannot be manually opened from outside.

13 Claims, 3 Drawing Sheets

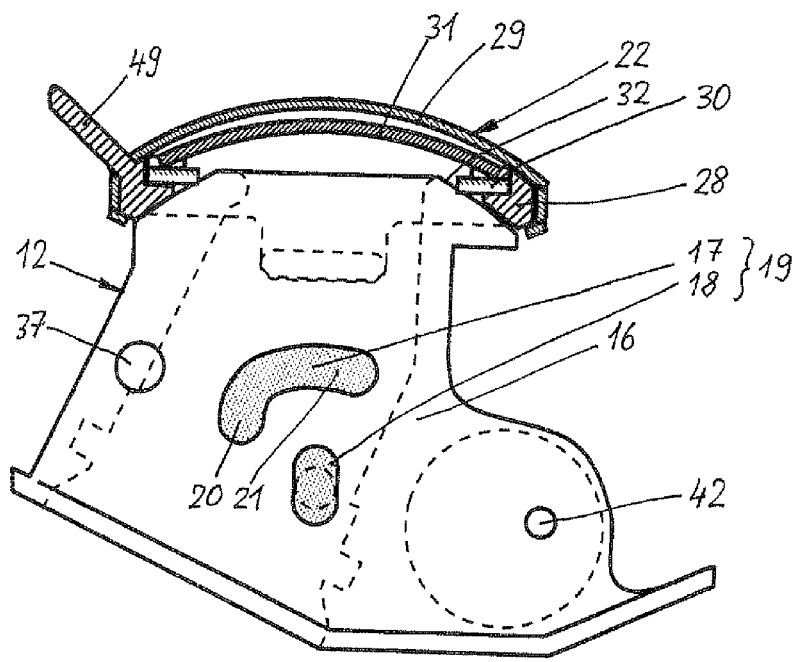
Fig. 3
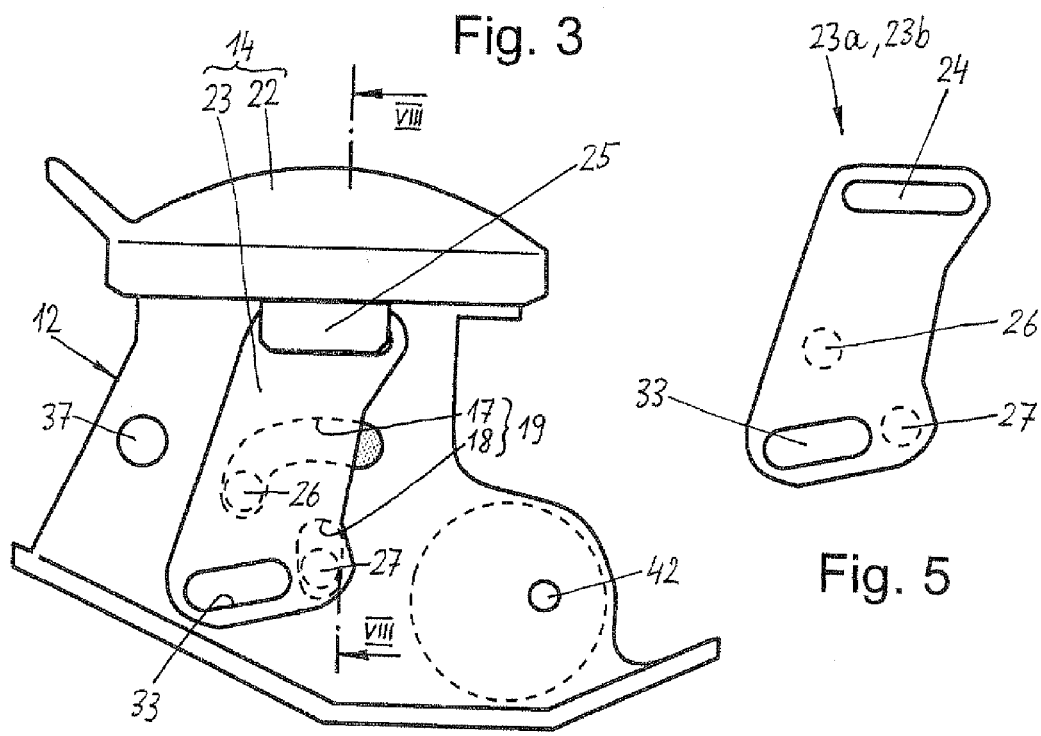
Fig. 4
Fig. 5

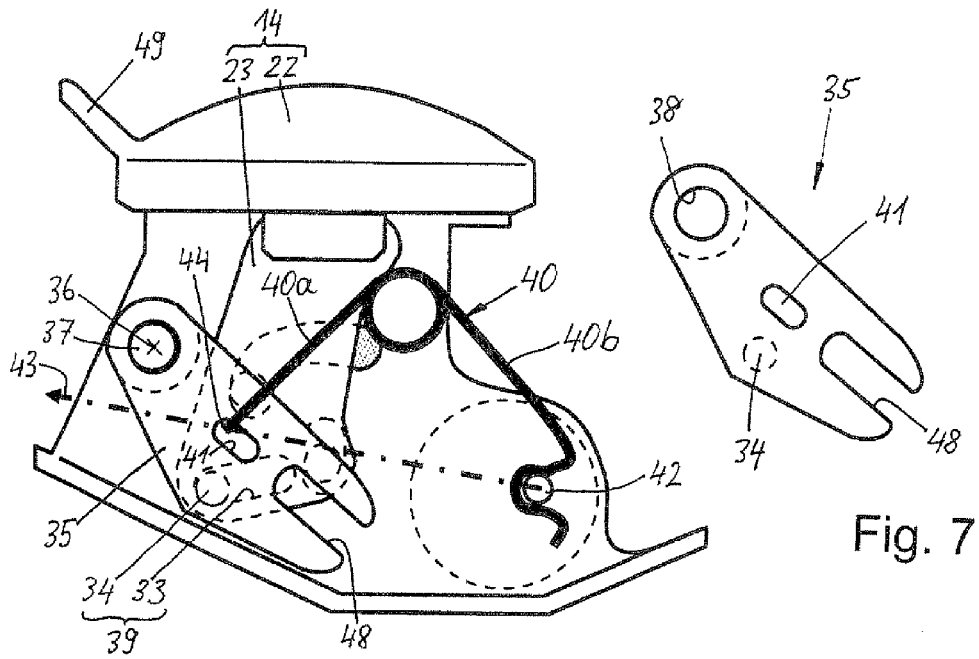
Fig. 6
Fig. 7
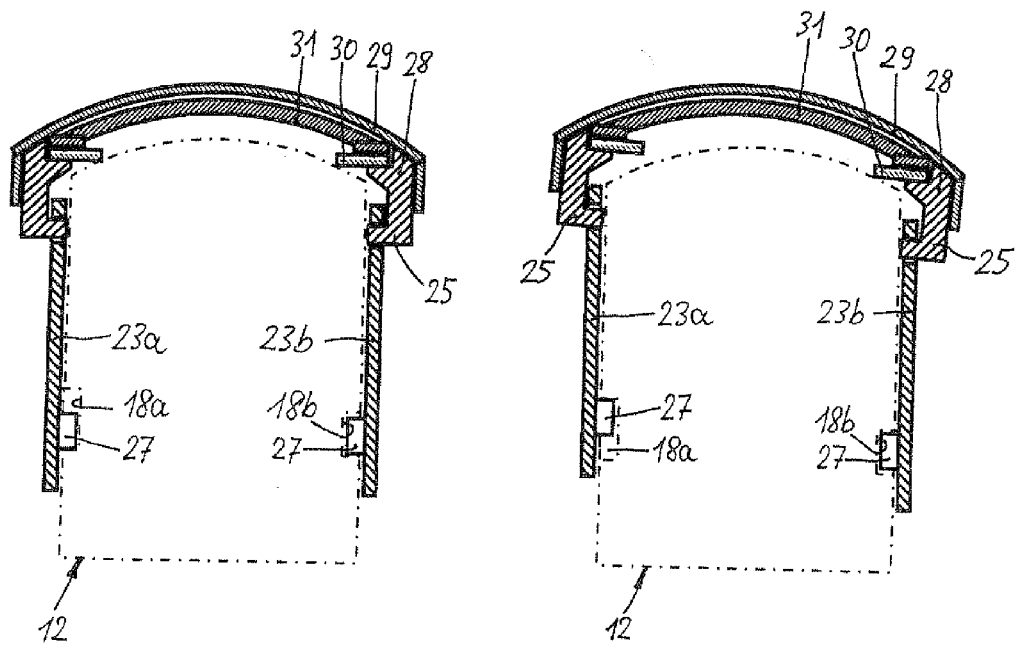
Fig. 8
Fig. 9

CLOSURE

CROSS-REFERENCE TO RELATED APPLICATION

This application claims priority to German Patent Application No. 10 2009 034 428.4 filed Jul. 23, 2009, the entire contents of which are hereby incorporated by reference.

FIELD

The invention relates to a closure for closing the orifice of a neck, in particular the orifice of a fuel filler neck for automotive vehicles, having a closure part that is movable, by means of a first guide slot, between a closed position in which the orifice of the neck is tightly closed and an open position in which the closure part is pivoted away from the orifice, and having an operating lever for movement of the closure part, which operating lever is mounted on the neck and hingedly-connected to the closure part.

BACKGROUND AND SUMMARY

In the context of the present invention, the term 'fuel' includes all possible types of energy source, i.e. not just liquid fuels but also, in particular, gas and electricity. Therefore, 'fuel filler neck' should be understood to mean, in particular, filler necks for fluid fuels as well as gas connection couplings and connection plugs for electrical power.

A closure of the above-mentioned type is known from DE 42 42 598 A1. In the case of the closure described therein, the closure part is movable by means of a guide slot such that, during the opening process, the closure part is initially raised somewhat perpendicularly relative to the orifice, and subsequently tilted away laterally relative to the external wall of the neck. The closure part is raised from the orifice of the neck by means of a rod-type operating lever, which is hinged at an end outside of the neck and at a distance therefrom is coupled to a pivot axis about which the closure part can execute a circular pivoting movement. A tension spring is fastened to a bearing outside the neck at one end and to the closure part at the other, in order to exert on the closure part a pretensioning force which forces the closure part back in the closing direction.

Based on this prior art, the object of the invention is to create a closure in which the closure part can be closed in an especially simple and reliable manner, which closure is optimised in terms of safety aspects, prevents any unauthorised opening of the closure by having a simple, space-saving design and, in addition, is as universally applicable as possible.

This object is achieved according to the invention by means of a closure with the features of claim 1. Advantageous embodiments of the invention are described in the further claims.

In the closure according to the invention, a spring mechanism is provided which is formed as a tightening device for drawing the closure part automatically into its final closed position.

Furthermore, the operating lever is hingedly-connected to the closure part by means of a second guide slot, which, when an opening force is introduced via the closure part, blocks the movement of the closure part from its closed position in the opening direction.

Owing to the fact that the spring mechanism automatically draws the closure part shut as far into its final closed position, no costly supplementary devices are necessary for this purpose. The closure according to the invention can be installed simply, cost-effectively and in a space-saving manner. It is especially advantageous in that, in the final closed position of the closure part, the spring mechanism retains the operating lever in a position in which a self-locking takes place between the operating lever and closure part via the second guide slot such that the closure part cannot be opened from outside, i.e. by grasping the closure part. This offers a high degree of security against any unauthorised opening of the closure as well as against accidental opening, i.e. the closure offers high crash security.

It is further especially advantageous that the closure according to the invention can be employed for all conventional fuels up to and including the closure of electrical connections. In addition, the closure requires no additional external flap but rather can be disposed so as to be freely accessible on the body of automobiles. The principle according to the invention enables simple operation with or without electrical drive. If an electric drive is provided, the closure is also suitable for use with robots. Owing to the additional reduction ratio created between the operating lever and closure part by the second guide slot, high sealing forces and a high degree of tightness of the closure can be ensured even with relatively small spring forces. If an electric drive is employed, the drive capacity required therefor may be kept low owing to the progressive reduction ratio resulting from the two guide slots. In addition, the complete closure may be configured such that it can be fitted and removed from outside in an especially simple manner.

According to one advantageous embodiment, the spring mechanism consists of at least one spring, which is fastened to the neck at one end and to the operating lever at the other and, during the closing movement of the closure part, exerts a pretensioning force on the operating lever in the closing direction at least from a specific pivot position of the closure part. Owing to the fact that the spring acts on the operating lever, the levering action of the operating lever can be employed in an especially effective manner. Alternatively or additionally to a spring of this kind, however, a spring that engages with the neck at one end and directly with the closure part at the other is also conceivable.

According to one advantageous embodiment, the spring is movable, during the closing and opening movement of the closure part, beyond a dead-centre position, between a first region beyond dead-centre and a second region beyond dead-centre, the spring exerting, in the first region beyond dead-centre, a pretensioning force on the closure part in the closing direction whereas, in the second region beyond dead-centre, it exerts a pretensioning force on the closure part in the opening direction. This means that the closure part is pretensioned not only, on the one hand, in the direction of its closed position, but also, on the other, in the direction of its open position. Thus, depending on the side of dead centre on which the spring is located, the spring pretensioning force operates either in the closing direction or in the opening direction of the closure part.

An especially simple, space-saving embodiment may be realised in that the spring consists of a leg spring.

According to one advantageous embodiment, the operating lever is mounted on the neck by means of a fixed pivot bearing. Because the operating lever is mounted on the neck itself and not on a bearing component located outside the neck, a module is created that can be fitted and removed in an especially simple manner.

According to one advantageous embodiment, the first and second guide slots are configured for the closure part and the coupling between the closure part and the operating lever such that, on introduction of force via the operating lever, the closure part is movable both in the opening and in the closing direction. As a result, the closure can be both opened and closed in a fully-automatic manner.

According to one advantageous embodiment, on introduction of a closing force via the closure part, the movement of the closure part in the closing direction from its open position is sanctioned so that the closure part can be guided back into its closed position through direct manual operation. In this way, the closing of the closure is possible in an especially simple manner, manually and without operating any electric motors or other closure mechanism, in that the closure part is briefly pivoted in the closing direction from outside, whereupon the spring mechanism then guides the closure part fully into its final, tightly-sealed closed position.

According to one advantageous embodiment, the first guide slot comprises two guiding slots provided in a lateral wall of the neck and guiding pins provided on the closure part and engaging in the guiding slots, the guiding slots running such that the closure part is initially raised from the closed position in a perpendicular direction relative to the plane of the orifice and is subsequently tilted away laterally relative to the external wall of the neck. This creates a two-stage movement sequence, which enables the closure part to be raised from the orifice of the neck and placed on this orifice, in an especially low-friction and precise manner which conserves material.

If an electric motor is employed to open and close the closure, it is advantageous if the electric motor is connected to the operating lever via a gearbox without self-locking. This has the advantage that, in the event of a non-active or failed electric motor, the closure can be operated manually by an emergency operation without it being necessary to decouple the electric motor or gearbox.

According to one advantageous embodiment, the operating lever may be operated by means of a cable mechanism and/or a lever mechanism. This has the advantage that the closure part can be opened from the vehicle interior via the cable mechanism or lever mechanism, which is routed into the vehicle interior. An embodiment of this kind thus represents an especially useful safety device in the event of failure of the electric motor.

If no electric drive is to be employed, it is also perfectly possible to slow the movement sequences of the closure part by means of a braking element, which acts either on the operating lever or on the closure part.

BRIEF DESCRIPTION OF THE DRAWINGS

The invention is described in greater detail below by way of the examples in the drawings. These show:

FIG. 3: a lateral view of a neck and a sectional view of a closure cap of the closure according to the invention, which closure cap is disposed on the neck, FIG. 4: a lateral view of the closure part and the neck.

FIG. 5: a lateral view of a strut of the closure part in isolation,

FIG. 6: a view according to FIG. 4, wherein an operating lever and a spring are also shown, FIG. 7: a lateral view of the operating lever from FIG. 6 in isolation, FIG. 8. a vertical section through the closure part along line VIII-VIII from FIG. 4, wherein the closure part is located on the neck in the closed position, and FIG. 9: a sectional view according to FIG. 8, wherein the closure part is raised from the neck at one end.

DETAILED DESCRIPTION

Figure 1:
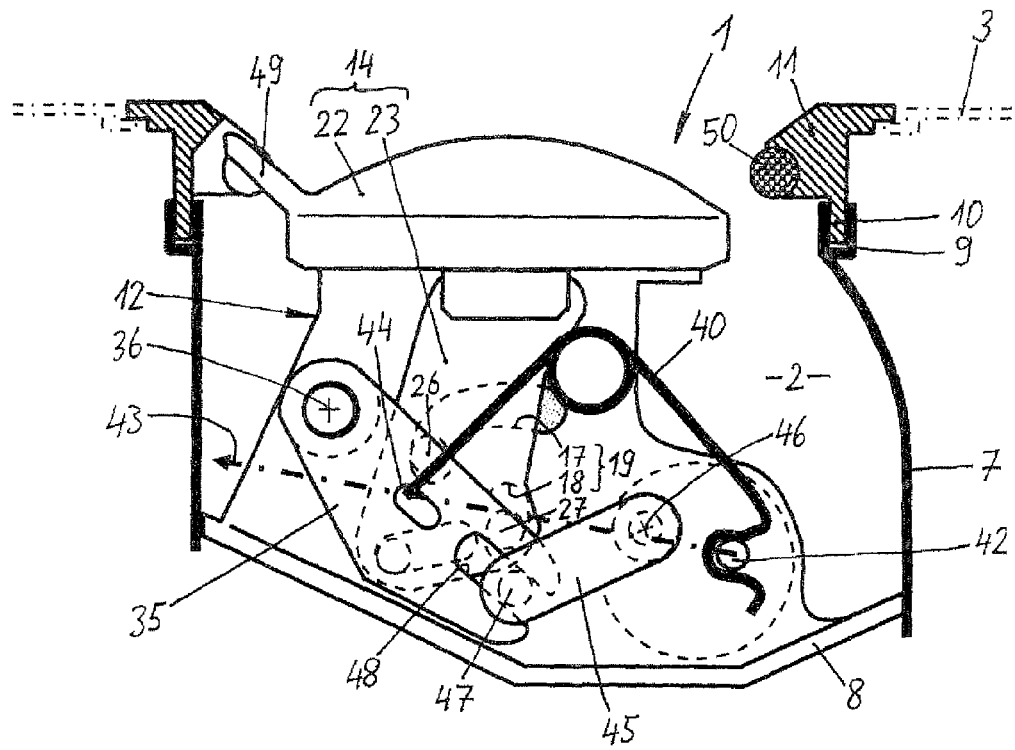
FIG. 1: an overall view of the closure according to the invention in the form of a fuel tank closure in lateral view, wherein the closure part is located in a depression in a vehicle body.
Figure 2:
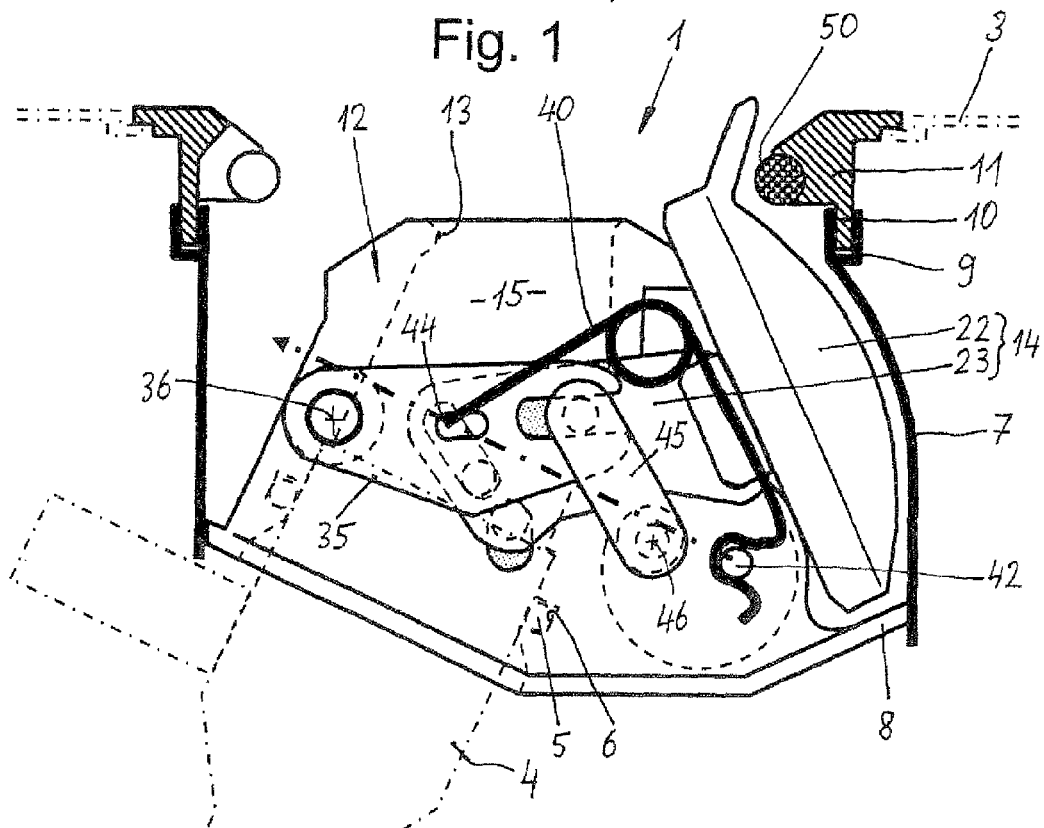
FIG. 2: a lateral view according to FIG. 1, wherein the closure part is located in the open position.

FIGS. 1 and 2 show a lateral view of a closure 1 according to the invention in the form of a fuel tank closure or tank closure, which is accessible through a recess in a vehicle body and disposed within a cavity 2 in the vehicle body. The adjacent edge region 3 of the vehicle body is shown schematically with broken lines.

As is apparent from FIG. 2, the closure 1 is positioned on a filler tube 4, leading to a vehicle fuel tank, which is not shown. The sealing action between the closure 1 and filler tube 4 takes place via an O-ring 5, which is located in an internal peripheral slot 6 in the closure 1.

The cavity 2 is defined laterally by a sleeve-type enclosure 7, which is advantageously made of an elastomer, against which the closure 1 with a base-located collar 8 is laterally supported. At the top, the enclosure 7 has an end region 9, which is U-shaped in cross-section. The peripheral slot in the end region 9, which slot is open in an upward direction, serves for the insertion of a web 10 of a mounting ring 11, which is placed onto the edge region 3 of the body from the outside and is advantageously locked to the body such that it can be released again only when the closure 1 is open.

The closure 1 has a sleeve-type neck 12 having an upper orifice 13 (FIG. 2) and a closure part 14 for closing and opening the orifice 13.

The orifice 13 represents the upper end region of a cavity 15 which extends axially through the neck 12. The filler tube 4 is inserted in the lower end region of the cavity 15. When the closure part 15 is open, a fuel nozzle, which is not shown, can be inserted into the cavity 15 and fuel can thereby be introduced into the filler tube 4.

FIG. 3 shows a lateral view of the neck 12 together with a sectional view of the closure part 14 in its closed position. The neck 12 has two opposing lateral walls having external, planar lateral walls, which are disposed in parallel relative to one another and parallel relative to the sheet plane. FIG. 3 shows only the lateral wall 16 that faces the viewer. The opposing lateral wall is advantageously configured in the same manner as the front lateral wall 16, but in mirror-image of it, so that in this case the description of the front lateral wall 16 applies in the same manner to the opposing lateral wall and only the visible lateral wall is described.

Provided in the lateral wall 16 are two guiding slots 17, 18, which are each part of a first guide slot 19 for the closure part 14. The guiding slot 17 is disposed above the guiding slot 18 and has a substantially C-shaped form. A first, lower slot portion 20 runs substantially in the axial direction of the neck 12, whereas a second, upper slot portion 21 runs substantially transversely relative to the axial direction of the neck 12. The lower guiding slot 18 runs substantially in the axial direction of the neck 12 and therefore parallel to, but with lateral offset from, the lower slot portion 20 of the upper guiding slot 17.

The guiding slots 17, 18 serve to guide the closure part 14 when it is moved between its closed position, which is shown in FIG. 1, and its open position, which is shown in FIG. 2. To this end, the closure part 14 has a closure cap 22 and two struts 23, one of which is shown in FIGS. 4 and 5. The strut disposed on the non-visible side of the closure 1 is formed as a mirror image of strut 23. The two struts 23 extend from the closure cap 22 laterally downwards adjacent to the lateral walls 16 of the neck 12, and consist of planar brackets, of which the principal plane runs parallel to the external lateral surfaces of the lateral walls 16.

In their upper end regions, the struts 23 are each equipped with a slot 24, which runs transversely relative to the longitudinal direction in order that suspension from diametrically opposing hook portions 25 of the closure cap 22 can take place, as shown in FIGS. 8 and 9.

The struts 23 are each further equipped with an upper guiding pin 26 and a lower guiding pin 27, which project inwards. The upper guiding pin 26 engages in the upper guiding slot 17, whereas the lower guiding pin 27 engages in the lower guiding slot 18. In the closed position of the closure part 14, the upper guiding pin 26 is located in the region of the lower slot portion 20 of the upper guiding slot 17, whereas the lower guiding pin 27 is located in a lower region of the lower guiding slot 18.

As a result of this arrangement, any opening of the closure part 14 is possible only in that, in the axial direction of the neck 12, the closure part 14 is initially slightly raised therefrom. Only after this axial movement does the upper guiding pin 26 reach the region of the transversely running slot portion 21 of the upper guiding slot 17, as a result of which the pivoting and tilting away of the closure part 14 laterally is enabled, as shown in FIG. 2.

It is apparent from FIGS. 3, 8 and 9 that the closure cap 22 has a peripheral, stable retaining ring 28, a concave-shaped cover 29, which extends over the retaining ring 28, a sealing ring 30 and an internal retaining cap 31. The sealing ring 30 is inserted in the retaining ring 28 and is held in place by means of the retaining cap 31. Further, the sealing ring 30 projects radially inwards beyond the retaining ring 28 such that the sealing ring 30 rests on a circular sealing seat 32 of the neck 12 to form a seal when the closure part 14 is located in the closed position.

The hook portions 25 for suspension of the struts 23 are portions of the retaining ring 28 which project downwards beyond the remaining portions of the retaining ring 28. If, as shown in FIGS. 8 and 9, the hook portions 25 are inserted with a little vertical clearance into the associated slots 24, the option also exists, in an especially simple manner, to raise only the one strut, specifically strut 23a, as shown on the left-hand side in FIGS. 8 and 9, when the closure part 14 is to be opened, whereas the other strut 23b does not have to be raised. The unilateral raising of the strut 23a, and thus of the closure cap 22, is shown in FIG. 9. This unilateral raising of the closure cap 22 at the start of the opening process can be perfectly adequate to open and close the closure cap 22 with a low exertion of force and in an especially low-friction, seal-preserving, precise manner. If the closure part is raised on one side only, as shown in FIG. 9, it is also sufficient if only the lower guiding slot on one side of the neck 12, i.e. guiding slot 18a in the present case, is of an elongated design, whereas the lower guiding slot 18b on the opposing side may take the form of a circular depression.

If both struts 23a, 23b have elongated lower guiding slots 18, as shown in FIG. 3, the two struts 23a, 23b may also perfectly well be permanently connected to the closure cap 22, for example may be permanently screw-connected thereto.

The guiding slots 17, 18 constitute, together with the guiding pins 26, 27, the first guide slot 19.

The struts 23 are each further equipped with a lower slot 33, into which guiding pins 34 of two operating levers 35 engage, one of which is shown in FIGS. 6 and 7. The two operating levers 35 are again disposed on opposing sides of the neck 12, wherein they extend laterally outside of the struts 23. The operating lever disposed on the side of the neck 12 that is not visible in FIG. 6 is of mirror-image design with the operating lever 35 shown. The guiding pins 34 each project inwards and into the slots 33 of the struts 23. The guiding pins 34, together with the slots 33, form a second guide slot 39, which acts between the operating levers 35 and the struts 23.

The operating levers 35 are mounted on the neck 12 so as to pivot about a pivot axis 36 that is stationary relative to the neck 12, wherein the pivot axis 36 is formed by bearing journals 37, which project from the neck 12 on both sides and engage in a bearing aperture 38 of the operating lever 35.

At least one of the two operating levers 35 is acted upon by a spring 40, which is designed as both a drawing-shut device for automatically drawing the closure part 14 into its final closed position, and also as an opening aid for conveying the closure part 14 into its open position, depending on the pivot position in which the operating lever 35 is located. The spring 40 takes the form of a leg spring and has a leg 40a, which engages in a spring-retaining aperture 41 of the operating lever 35, and with a leg 40b, which is supported against a support pin 42 of the neck 12. The support pin 42 is fastened to the neck 12 in a stationary manner and projects laterally outwards beyond its external wall. As is apparent from FIGS. 1, 2 and 6, the support pin 42 and pivot axis 36 are located on opposing sides relative to the strut 23. The spring 40 is inserted with pretensioning such that it attempts to force its two legs 40a, 40b apart.

When the closure part 14 is located in its closed position, the operating lever 35 is located in the lowest pivot position, i.e. in a position in which the guiding pins 34 assume their lowest possible position, as shown in FIGS. 1 and 6. In this position, the spring 40 exerts on the operating lever 35 a pretensioning force, the direction of which lies on the straight connecting line 43 between the support pin 42 and the engagement point 44 of the spring 40 on the operating lever 35. The force direction runs in the closing direction below the pivot axis 36 so that a pretensioning force is exerted on the operating lever 35 and attempts to move the operating lever 35 clockwise, i.e. in the closing direction. If, on the other hand, the operating lever 35 is pivoted upwards, i.e. anti-clockwise, by means of an operating mechanism that acts on the free end of the operating lever 35, the engagement point 44 between the spring leg 40a and the operating lever 35 moves upwards. In a position of the operating lever 35 in which the straight connecting line 43 runs through the pivot axis 36, the spring 40 cannot exert any torque on the operating lever 35. This position of the spring 40 and of the operating lever 35 is designated the dead-centre position. If the operating lever 35 is pivoted further anti-clockwise in the opening direction, the straight connecting line 43 runs above the pivot axis 36, as shown in FIG. 2. In this region, the spring 40 exerts on the operating lever 35 a pretensioning force that attempts to pivot the operating lever 35 further in the opening direction, i.e. anti-clockwise, as a result of which the conveyance of the closure part 14 into its final open position, as shown in FIG. 2, is supported. The two pivot regions of the operating lever 35 on this side and the other side of the dead-centre position may be designated the region beyond dead-centres.

The manner in which the operating lever 35 is activated is shown only schematically in FIGS. 1 and 2. As shown, a pivot lever 45, which is pivoted about a pivot axis 46 by a not-shown electric motor, cable mechanism or lever mechanism and which is equipped at the opposing end with an operating pin 47 that engages in an aperture 48 of the operating lever 35, may be used for the purpose. Other solutions in which the operating lever 35 is acted upon directly by an electric motor, cable mechanism or lever mechanism and pivoted in the desired manner are also conceivable. Provided between the operating lever 35 and electric motor may be gearing, for example spur gears or planetary gears. Stepping motors for pivoting the operating lever 35 are also conceivable. Operating mechanisms of this kind may act either on just one or on both operating levers 35. Furthermore, it is also possible to provide a spring 40 on one side or on both sides of the neck 12.

The movement sequence for opening and closing the closure part 14 will be described in greater detail below. If the closure part 14 is located in the closed position shown in FIG. 1, the closure cap 22 can initially be held tightly against the sealing seat 32 just by the pretensioning force of the spring 40, which pulls the struts 23 downwards, at least mainly in the axial direction of the neck 12, via the guiding pins 34 of the operating lever 35, so that the orifice 13 is tightly closed. If the operating lever 35 is pivoted upwards by means of an operating mechanism, for example the pivot lever 45, the guiding pin 34 of the operating lever 35 moves along the slot 33 of the struts 23a, 23b. Since this slot 33 is located at least slightly obliquely, i.e. runs at least partially in the axial direction of the neck 12, the downward-acting tensile force on the closure cap 22 is cancelled. If the slope of the arc executed by the guiding pin 34 about its pivot axis 36 is greater than the gradient of the slot 33, the strut 23, and thus the closure cap 22 also, is actively raised by the guiding pin 34. Pending arrival at the dead-centre position, the operating lever 35 has to be pivoted against the pretensioning force of the spring 40. If the operating lever 35 is pivoted further upwards, then, owing to the movement control by the first guide slot 19, the closure cap tilts away laterally relative to the external wall of the neck 12, wherein the closure cap 22 reaches an intermediate space between the neck 12 and the sleeve-type enclosure 7, as shown in FIG. 2. The pretensioning force of the spring 40 now acts, as already described, such that it forces the closure part 14 into its open position.

The opening of the closure part 14 is possible only when the operating lever 35 is actively pivoted by means of an internally-located operating mechanism. Conversely, any opening of the closure part 14 from the outside, i.e. via the closure cap 22, is not possible since the first guide slot 19 and the second guide slot 39, supported by the tensioning force of the spring 40, interact in a self-locking manner.

The closing of the closure part 14 from the open position shown in FIG. 2 takes place in a reverse manner. Starting from the position shown in FIG. 2, the pivot lever 45 is pivoted anti-clockwise by means of for example an electric motor, as a result of which the operating lever 35 is pivoted downwards, i.e. in the closing direction. The guiding pin 34 of the operating lever 35 carries the strut 23 along so that the closure part 14, guided by the first guide slot 19, is pivoted in the closing direction. This pivoting movement initially takes place counter to the pretensioning force of the spring 40. Once the dead-centre position is exceeded, however, the spring 40 supports the further closure process right up to the final closed position. Shortly before the final closed position, the pivoting movement of the closure part 14 changes by virtue of the curvature characteristic of the guiding slots 17, 18 into an axial movement along the neck 12.

The manual closure of the closure part 14 from the outside, i.e. by grasping and pivoting the closure part 14, is, however, readily possible even if the operating mechanism, for example an electric motor, is switched off or defective. The first guide slot 19 and second guide slot 39 interact, when the closure part 14 is open, such that no self-locking exists in the closing direction. Therefore, only the pretensioning force of the spring 40 has to be initially overcome until the dead-centre position is reached. Subsequently, the spring 40 pulls the closure part 14 automatically into its final closed position, wherein, owing to the increasingly progressive reduction ratio in the closing direction, elevated closing forces are achieved at the end of the closure phase.

The option of manual closure from the outside enables, on the one hand, a simple, rapid closure of the closure part 14 and, on the other, a simple emergency closure if the electric motor, cable mechanism or lever mechanism with which the operating lever 35 is driven should fail.

In order to facilitate closure of the closure part 14, a handle 49 may be added to the closure cap 22 in the form of an extension projecting obliquely upwards, which may be easily grasped when the closure part 14 is open, see FIG. 2. This handle 49 may also serve as a stop, which, in the open position of the closure part 14, encounters an elastomer ring 50, which is provided on the internal peripheral wall of the mounting ring 11 and projects inwards beyond the mounting ring slightly radially. Conversely, in the closed position as shown in FIG. 1, the handle 49 is located far enough inside the mounting ring 11 for the grasping of the handle 40 with the fingers to be impossible.

It is also apparent from FIGS. 1 and 2 that the closure cap 22 exhibits a spacing from the mounting ring 11 and the ring 50, so as to ensure that the closure cap 22 has freedom of movement and no friction occurs between these components. Any water that enters between the mounting ring 11 and the closure cap 22 is removed from the cavity 2 by means of suitable drainage means, which are not shown.

It is apparent from the embodiment shown that the closure cap 22 is positioned directly onto the neck 12 and seals the neck directly. If this is not possible for reasons of space, for example owing to necessary angulations, an intermediate seal may be employed, which is preferably joined and secured according to the rapid-coupling principle.

Within the scope of the invention, a multiplicity of variations are possible. For example, a light source may be integrated into the mounting ring 11 and serve to illuminate the closure 1 or to provide the user, by means of colour changes or light pulses, with additional information, for example concerning fill level, charge level, maintenance phase etc.

The invention claimed is:

1. Closure for closing the orifice of a fuel filler neck for automotive vehicles, comprising:
   a closure part that is movable, using a first guide slot, between a closed position in which the orifice of the neck is tightly closed and an open position in which the closure part is pivoted away from the orifice;
   at least one operating lever for movement of the closure part, which operating lever is mounted on the neck and hinged to the closure part; and
   a spring mechanism which takes the form of a tightening device for drawing the closure part automatically into its final closed position,
   wherein the operating lever is hinged to the closure part by a second, additional guide slot separated from the first guide slot, which, when an opening force is introduced via the closure part, blocks the movement of the closure part from its closed position in the opening direction.

2. Closure according to claim 1, wherein the spring mechanism consists of at least one spring, which is fastened to the neck at one end and to the operating lever at the other and, during the closure movement of the closure part, exerts a pretensioning force on the operating lever in the closing direction at least from a specific pivot position of the closure part.

3. Closure according to claim 2, wherein the spring is movable, during the closing and opening movement of the closure part, beyond a dead-centre position, between a first region beyond dead-centre and a second region beyond dead-centre, wherein, in the first region beyond dead-centre, the spring exerts a pretensioning force on the closure part in the closing direction, whereas, in the second region beyond dead-centre, it exerts a pretensioning force on the closure part in the opening direction.

4. Closure according to claim 2, wherein the spring consists of a leg spring.

5. Closure according to claim 1, wherein the operating lever is mounted on the neck by means of a fixed pivot bearing.

6. Closure according to claim 1, wherein the first and second guide slots are configured such that, on the introduction of force via the operating lever, the closure part is movable both in the opening and in the closing direction.

7. Closure according to claim 1, wherein, on introduction of a closing force via the closure part, the movement of the closure part in the closing direction from its open position is permitted, so that the closure part can be guided back into its closed position through direct manual operation.

8. Closure according to claim 1, wherein the first guide slot comprises two guiding slots provided in a lateral wall of the neck, and guiding pins provided on the closure part and engaging in the guiding slots, the guiding slots running such that the closure part is initially raised from the closed position in a perpendicular direction relative to the plane of the orifice and is subsequently tilted away laterally relative to the external wall of the neck.

9. Closure according to claim 1, wherein the second guide slot comprises an oblong slot provided on the closure part and a guiding pin, which is fastened to the operating lever and engages in the slot.

10. Closure according to claim 1, wherein a projecting handle is provided on the closure part to pivot the closure part in the closure direction.

11. Closure for closing the orifice of a fuel filler neck for automotive vehicles, comprising:

a closure part that is movable, using a first guide slot, between a closed position in which the orifice of the neck is tightly closed and an open position in which the closure part is pivoted away from the orifice;

at least one operating lever for movement of the closure part, which operating lever is mounted on the neck and hinged to the closure part; and a spring mechanism which takes the form of a tightening device for drawing the closure part automatically into its final closed position, wherein:

the operating lever is hinged to the closure part by a second guide slot, which, when an opening force is introduced via the closure part, blocks the movement of the closure part from its closed position in the opening direction;

the operating lever is operationally connected to an electric motor for moving the closure part; and the electric motor is operationally connected to the operating lever via gears without self-locking.

12. Closure according to claim 1, wherein the operating lever may be operated via a cable mechanism and/or a lever mechanism.

13. Closure according to claim 11, wherein the second guide slot comprises an additional guide slot which is separated from the first guide slot.

* * * * *